July 25, 1961 — W. E. MEYERHOF — 2,993,996
MOVABLE TARGET FOR BORE HOLE ACCELERATOR
Filed July 27, 1956

INVENTOR
WALTER E. MEYERHOF
BY
ATTORNEYS

United States Patent Office 2,993,996
Patented July 25, 1961

2,993,996
MOVABLE TARGET FOR BORE HOLE ACCELERATOR

Walter E. Meyerhof, Menlo Park, Calif., assignor to California Research Corporation, San Francisco, Calif., a corporation of Delaware
Filed July 27, 1956, Ser. No. 600,589
6 Claims. (Cl. 250—84.5)

The present invention relates to apparatus for generating high-energy nucleons and more particularly to apparatus for generating essentially mono-energetic neutrons in linear accelerators employing the deuterium-tritium reaction.

It is an object of the present invention to provide an improved bore hole accelerator for generating essentially mono-energetic nucleons such as neutrons, wherein a target containing a reactant nuclear material is bombarded by nuclear particles accelerated in an evacuated discharge space. The reaction is maintained substantially constant in intensity by providing relative movement between a beam of nuclear particles and the target material, preferably formed as an elongated strip of material having loaded thereinto nuclear reactant material such as tritium. A focused beam of ions, preferably containing deuterons supplied by a source of deuterium gas, is focused on a movable target strip of material, preferably zirconium, containing tritium. When current passes from the ion source through the high-energy beam to the target area, deterioration of the mono-energetic source due to the deposit of deuterons in the target material and loss of tritium from the target due to overheating is avoided by continuously presenting an uncontaminated and cooled target from which neutrons are produced with constant intensity.

In the investigation of earth formations traversed by a well bore by the use of radioactivity logging, it has recently been found that certain high-energy nuclear reactions can be produced by linear particle accelerators such as those using a deuterium-tritium reaction to produce neutrons. Such neutrons may be used to investigate either the hydrogen content of a well bore and the earth formations by direct detection of neutrons, or the chemical constituents of the earth formations may be investigated by nuclear spectroscopy techniques which involves irradiation of the formation by neutrons, and simultaneously, or subsequently, detecting gamma rays generated by interactions between the neutrons and the nuclei in the formation to produce said gamma rays. In operation of such linear accelerators it has been found that under bore hole temperature and pressure conditions the high-energy neutron source intended to produce essentially mono-energetic neutrons soon begins to produce a wide spectrum of energies. One of the most commonly used reactions for such bore hole accelerators is the tritium-deuterium reaction wherein deuterons contained in deuterium gas are accelerated through an evacuated space in a stream of ions and impinge on a material such as zirconium "loaded" with tritium gas. Each such reaction produces $He^4+$ neutrons with kinetic energies of approximately 14 mev. However, after a short period of irradiation of the target, deuterons are absorbed by the target material. The reaction of deuterium on deuterium produces $He^3+$ neutrons having kinetic energies of approximately 5 mev. At the same time the current density required for the tritium-deuterium (T-D) reaction causes heating of the tritium target and loss of tritium gas therefrom. Thus the initial high energy source is gradually converted to a source of relatively low-energy neutrons of weak intensity and the resultant reaction with the earth formation is the same as though a spectrum of neutron energies, extending into the low-energy range, were being generated with weak intensity within the accelerator.

In accordance with the present invention, the foregoing difficulties are to a great extent eliminated by the provision of relative motion between the high-energy beam of deuterons and the target material. In a preferred form of apparatus the target is formed in the form of strip of zirconium wound in reel form and adapted to be driven at a relatively slow speed, sufficient only to prevent overheating, and absorption of deuterons, during operation of the accelerator. Preferably the target is adapted to be wound, and if necessary rewound, as it passes through the target area defined by the beam of nuclear particles, such as deuterons, accelerated in an electron stream. In said preferred form of apparatus an ion source such as a heated filament is arranged to drive electrons from a cathode. Deuterons are produced from a minute flow of deuterium gas that is ionized by the electron beam generated by the cathode. They are then accelerated and focused on target. Such focusing may of course be performed by deflection plates and drift tubes positioned to guide and accelerate deuterons. Accelerating potential is provided between the cathode and the target material to attract the accelerated particles.

Further objects and advantages of the present invention will become apparent from the following detailed description taken in conjunction with the accompanying drawing, which forms an integral part of the present specification.

Figures 1, 2:
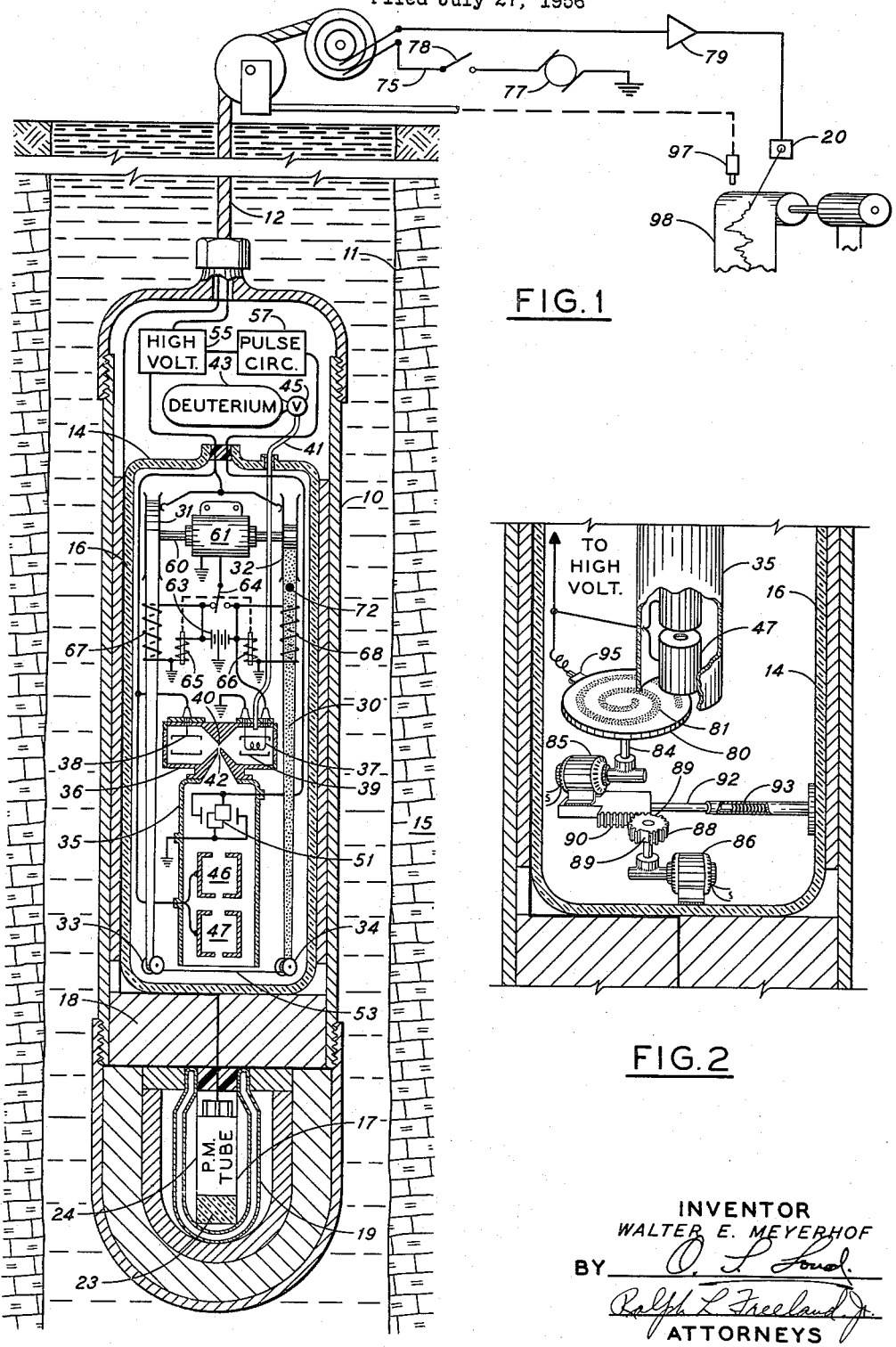
FIG. 1 illustrates a preferred form of the present invention as applied to a linear accelerator useful in radioactivity well logging, and particularly shows, in vertical section, a preferred form of apparatus for moving the target through the beam of deuterons.
FIG. 2 is an alternative form of target arrangement for an accelerator of the type shown in FIG. 1, wherein the accelerating beam moves over a circular target in a spiral motion.

Referring now to the drawing and in particular to FIG. 1, there is illustrated a well logging sonde 10 adapted to traverse a well bore 11 on the lower end of a well logging cable 12. Within logging sonde 10 is positioned a linear accelerator 14, including an elongated shell 16 forming an evacuated chamber. Accelerator 14, constructed in accordance with a preferred form of the present invention, has an elongated target strip 30 movable in the linear accelerator chamber. Said accelerator is normally operated to produce neutrons by the deuterium-tritium reaction for the bombardment of earth formation 15 surrounding well bore 11, but may be operated to generate electromagnetic radiations, such as gamma rays. Reactions between the chemical constituents in earth formation 15, and particularly the nuclei of such chemicals, and the fast neutrons are arranged to be detected through resultant gamma radiation by an energy-measuring arrangement such as scintillation counter 17, shielded from accelerator 14 by shielding material 18. Scintillation counter 17 is mounted in a Dewar flask 19 for thermal insulation during the downhole run.

Depending upon the radiation to be measured by scintillation detector 17, such as the neutron-capture gamma radiation spectra, individual nuclear energies are detected and transmitted to the earth's surface by well logging cable 12 and then recorded by amplifier 79 and oscillograph 20 in chart 98. The depth of sonde 10 in the bore hole is indicated by depth marker 97 printing suitable indicia on chart 98. Another reaction measurable with scintillation counter 17, including crystal 23 and photomultiplier tube 24, is the inelastic scattering of fast neutrons to produce gamma rays. One of the most interesting measurements of this type in well logging is the detecting of carbon and oxygen by measurement of gamma ray energies produced when nuclei of these elements are bombarded with neutrons of about 14 mev. The success of such measurements is dependent upon all of the neutrons having high energy when transmitted into the well bore. This energy must be in the 14 mev. range. Energies in the 5 mev. range or less are not suitable, since they will not produce the desired reaction.

For the purpose of maintaining neutrons from accelerator 14 at the 14 mev. level, there is provided by the present invention, as seen in the embodiment of FIG. 1, a movable target 30. Moving target 30 comprises a strip of metal foil desirably threaded between a pair of spools 31 and 32 over pulleys 33 and 34 to intercept the beam of charged nuclear particles generated within the linear focusing and accelerating "gun" section identified as 35. At least the exposed surface of movable target 30 is "loaded" with an active material. In the preferred system, this material is tritium. Within particle gun 35, a heated filament 37 is arranged to generate ions and electrons from a cathode cylinder 39.

As electrons are boiled off of cathode 39 they are attracted by the charge on anode cylinder 38. At the same time deuterons are generated in the cathode chamber by introducing a small leak of deuterium gas from pressure bottle 43 through control valve 45 and tube 41. The electron beam, including deuterons, is then accelerated through the restriction 40 by the potential gradient between cathode 39 and anode 38. In this acceleration, deuterons are produced by collisions between the accelerated electrons and the neutral deuterium gas atoms. Thus, deuterons are present in the stream flowing through restriction 40 and these positively charged particles may be attracted through the vertical passageway 42 to form a charged particle beam. This beam is then focused by plates 51 and accelerated by electrodes 46 and 47, positioned to guide the accelerated deuterons onto exposed portion 53 of movable target 30. Accelerating potential for the beam of deuterons is provided by high voltage source 55, suitably connected to movable target 30 through the sliding contacts to reels 31 and 32. Accelerating electrodes 46 and 47 and anode 38 are also held at suitable potentials by high voltage source 55.

In the present arrangement the deuteron beam may be continuously energized, but preferably it is pulsed to strike the target intermittently on a time cycle, of say two milliseconds (.002 sec.) on and two milliseconds off. Such pulsing of the beam is accomplished by pulse circuit, indicated as 57. Pulse circuit 57 varies the potential on focus electrodes 51 so that the beam will be deflected from accelerator electrodes 46 and 47 and not reach target electrode 30.

In the preferred embodiment shown in FIG. 1, target tape 30 is reversible. By such arrangement the elongated tape or strip may be successively wound between reels 31—32. Each of the reels 31 and 32 is preferably carried on the opposite end of shaft 60 of motor 61. Said shaft is desirably formed of insulating material to permit reels 31 and 32 to hold the proper operating potential on tape 30. The direction of winding and unwinding of the tape is of course selected so that the same direction of rotation of shaft 60 will result in the tape's being withdrawn from one reel, say 32, and wound onto the opposite reel, say 31. While, as mentioned above, the tape desirably is driven slowly from one reel to the other, the system is so arranged that the tape may be moved more rapidly by successively winding and rewinding it on the opposite reels.

FIG. 1 illustrates diagrammatically one system for reversing the tape. In this system motor 60 is driven by a suitable D.C. source such as battery 63 that is center-tapped to permit the direction of current flow to be changed by reversing switch 64. Operation of switch 64 from one contact to the other connects motor 61 to opposite ends of battery 63. Switch 64 in the present arrangement is actuated by relays 65 and 66 which are respectively operated by magnetic coils 67 and 68. Coils 67 and 68 surround the portion of tape 30 just below the respective reels 31 and 32. As mentioned above, the tape is normally formed of zirconium into which tritium has been loaded. Accordingly, a magnetic sensing element preferably formed of low-carbon iron in the form of a disc, illustrated as 72, is affixed to the end of the tape nearest its connection to the reel. Upon passage of this iron disc or slug 72 through coil 68 the magnetic reluctance of the circuit, including relay 66, is changed sufficiently to energize switch 64 into its opposite position. Upon such reversal of position of contact 64 motor 61 is reversed in its direction of rotation so that tape is fed off reel 31, passes over roller 33 to traverse the charged particle beam, and then passes over roller 34 for rewinding on reel 32.

Operation of the accelerator is preferably controlled from the earth's surface through cable 12 and lead line 75, which connects the logging sonde to a source of power such as generator 77 through switch 78. Recording of the nuclear events may be made either at the earth's surface or in logging sonde 10. For simplicity of illustration the recording system is shown at the earth's surface.

Reference is made now to the alternative embodiment of movable target for linear accelerators, shown in FIG. 2. It will be seen that target 80 is formed as a circular disc and has the activated target material 81 formed as a spiral on the face of disc 80. Provision is made for moving disc 80 so that the target material follows directly under the particle beam as it emerges from accelerating electrode 47. The accelerator tube, or gun portion, 35 of FIG. 2 is identical with that shown in the arrangement of FIG. 1.

Target material 81 is moved circularly and transversely to the accelerated particle beam by a pair of motors 85 and 86. These motors drive gear arrangements which include means for rotating disc 80 and means for transversely moving disc 80 and shaft 84 upon which it rotates. The center of rotation of disc 80 is moved laterally by motor 86 which in turn drives a pinion gear 88 having a pair of flat portions indicated as 89. These gaps permit rack 90 to be driven from left to right, as seen in FIG. 2, by the action of compression spring 93. The construction is such that rack 90 forms the support for motor 85 and both rack and motor slide laterally on rod 92. At the end of each stroke, pinion 89 disengages from rack 90 so that compression spring 93 drives rod 92 to its left-hand position (shown in FIG. 2). It will be seen that with both motors 85 and 86 synchronized, disc 80 will rotate and move transversely relative to the accelerated particle beam so that active material 81 is continuously irradiated by the beam.

Motors 85 and 86 have been illustrated separately to simplify explanation of their functions. Desirably, the gear mechanism will be driven by a single motor so that both shaft 84 and disc 80 will rotate in synchronism with the lateral movement of the disc relative to the particle beam. The speed of movement of the active material past the beam is regulated so that heat dissipated by the target disc will be rapid enough to prevent deterioration of the target material and avoid the absorption of deuterons in the active material. Since target disc 80 is connected to the high voltage source through brush 95, shaft 84 is desirably formed of an insulating material.

From the foregoing detailed description it can be seen that there is provided an improved form of linear accelerator wherein overheating, and absorption of bombarding particles into the target material from which neutrons or other nucleons may be ejected, is avoided by providing relative movement between the charged particle beam and the accelerator target. The accelerator so operated can either be programmed to emit nucleons into the earth formation on a continuous basis or, in its preferred manner of operation, the beam is pulsed to emit neutrons at discreet intervals. Control of this pulsing technique is provided by pulse circuit 57, which may include a suitable modulator for applying a deflection potential to plates 51 of the electron gun. Such deflection potential will direct the beam containing heavy charged particles from the source in manner to cause said beam to miss the accelerating electrodes 46 and 47. By interruption of the flow of the charged particle beam through said accelerating electrodes, the beam intensity is modulated in accordance with the potential applied to plates 51.

While the foregoing description has dealt particularly with acceleration of charged particles of appreciable mass, such as deuterons, such apparatus may, of course, be used in linear accelerators for positive ions or electrons. In the reaction of electrons and other charged particles having sufficient relativistic mass to cause nuclear disintegrations in a target material, the energy absorbed may be sufficient to cause heating and destruction of the target material. Accordingly, the present arrangement for longitudinally moving the target relative to the charged particle beam has application in any arrangement of linear accelerator, and particularly where the target material "outgasses" or neutral gas molecules are added to the evacuated system. It will thus be seen that the present arrangment reduces the amount and frequency of vacuum pumping required to operate the accelerator on a continuous basis; the present arrangement also greatly reduces the amount of getter material required to maintain the vacuum system.

In certain linear accelerator reactions the charged particles require only a few tens of kilovolts to attain the necessary energy to disintegrate nuclei on the target. The tritium-deuterium reaction is one example of such a low-energy process. With systems of this type, it is also possible to deflect the accelerated beam relative to a substantially fixed target. The beam may be deflected either mechanically or magnetically. However, space is required for such post acceleration deflection of the beam. Accordingly, in the preferred form of the invention, the target is moved rather than the beam. When high potentials are required in the accelerator, magnetic deflection becomes more difficult in a reasonable space.

While various modifications and changes in the foregoing apparatus will occur to those skilled in the art, all such modifications and changes falling within the scope of the appended claims are intended to be included therein.

I claim:

1. In well logging apparatus for investigating the constituents of earth formations traversed by a well bore by irradiation thereof with high-energy nuclear radiation comprising a well logging sonde having positioned therein radiation detecting means and an accelerator for high-energy nuclear particles, said accelerator including chamber means formed by a shell adapted to be evacuated, electron-generating means within said chamber, a source of atomic particles, means for introducing said atomic particles into the electron stream to generate charged nuclear particles, means for accelerating said charged nuclear particles to a predeterminable velocity along a linear path within said chamber means, and means for focusing the resultant particles as a beam onto a target area within said chamber means, the improvement that comprises an elongated strip of target material, means positioned within said chamber means for traversing said target area with said elongated strip, said strip of target material having absorbed on its surface passing through said target area a material capable of reacting with said accelerated beam of nuclear particles to produce nuclear radiation of very high energy, and means for applying a potential gradient from said target through said beam of nuclear particles to said electron generating means to control the output of nuclear energy from said target strip without localized deterioration thereof due to adsorption of the bombarded material from said target strip or absorption of the bombarding material into said target strip.

2. Apparatus in accordance with claim 1 wherein said elongated target strip is in the form of a coil of zirconium foil having tritium absorbed therein and said means for passing said strip under said beam includes a pair of spools upon which said foil may be wound and unwound, and means for rotating said spools within said chamber means.

3. Apparatus in accordance with claim 1 wherein said elongated target strip is formed on a disc of zirconium having tritium absorbed on the surface thereof and said means for passing said strip under said beam includes means for rotating said disc within said chamber means in substantially a spiral configuration with respect to said beam.

4. A bore hole accelerator for generating essentially mono-energetic neutrons comprising means forming an evacuated chamber, means for generating a beam containing deuterons, means for focusing said beam on a preselectable target area within said chamber, means for accelerating said deuterons in said beam to an energy sufficient to interact with nuclei in a target material positioned in said target area, strip means within said chamber forming an elongated target having high nuclear absorptivity for deuterons on at least one surface, drive means within said chamber for establishing longitudinal movement between said elongated target surface and said target area, and means for establishing an electrical current path between said deuteron generating means and said target.

5. A borehole accelerator for generating essentially monoenergetic neutrons having energies of at least 14 mev. comprising means forming an evacuated chamber, an ion source positioned within said chamber, potential means for accelerating a stream of ions from said source toward an electrode within said chamber, means for supplying a predeterminable amount of deuterium gas into said ion stream to generate deuterons, an elongated target electrode strip positioned within said chamber, said strip being formed of material having a high absorptivity for deuterons on at least one of its surfaces and said material surface being loaded with tritium, means for establishing a confined electrical current path between said ion source and a target area on said target electrode strip to accelerate a beam of deuterons toward said target surface, means for focusing said beam on said target area, and means within said chamber for moving said elongated target electrode strip relative to said beam to prevent exhaustion of tritium from said target and contamination of said target strip with deuterons absorbed therein whereby low-energy neutrons resulting from deuteron-deuteron interaction is reduced and the desired deuteron-triton reaction producing high-energy neutrons is enhanced.

6. A borehole accelerator for generating essentially monoenergetic neutrons having energies of at least 14 mev. comprising means forming an evacuated chamber, an ion source positioned within said chamber, potential means for transporting a stream of ions from said source toward an electrode within said chamber, means for supplying a predeterminable amount of deuterium gas into said ion stream to generate deuterons, an elongated target electrode strip within said chamber, said strip being formed of material having a high absorptivity for deuterons on at least one of its surfaces and said surface having tritium absorbed thereon, spool means for storing an elongated section of said electrode strip within said chamber, means for positioning a portion of said strip unwound from said spool means within a target area, means for establishing an electrical current path between said ion source and said target area to accelerate a beam of deuterons toward said portion of said strip, means for focusing said beam on said portion, means for periodically interrupting said beam to control the duration of impingement of said beam on said portion, and means within said chamber for driving said spool means to wind and unwind alternately said target electrode strip for passage through said target area whereby the temperature of said portion of said target strip is maintained sufficiently low to prevent exhaustion of tritium from said target and contamination of said target by deuterons absorbed on said target strip from said deuteron beam.

References Cited in the file of this patent

UNITED STATES PATENTS

| | | |
|---|---|---|
| 2,058,105 | Pohl | Oct. 20, 1936 |
| 2,275,748 | Fearon | Mar. 10, 1942 |
| 2,478,681 | Beers | Aug. 9, 1949 |
| 2,576,600 | Hanson | Nov. 27, 1951 |
| 2,689,918 | Youmans | Sept. 21, 1954 |
| 2,735,019 | De Wan et al. | Feb. 14, 1956 |
| 2,751,505 | Anderson | June 19, 1956 |
| 2,769,096 | Frey | Oct. 30, 1956 |
| 2,852,696 | Johnson | Sept. 16, 1958 |